(12) United States Patent
Hsu et al.

(10) Patent No.: US 7,593,609 B2
(45) Date of Patent: Sep. 22, 2009

(54) METHOD FOR MODULATING REFRACTIVE INDICES OF OPTICAL FIBER GRATINGS

(75) Inventors: Kuei Chu Hsu, Tainan County (TW); Yin Chieh Lai, Taichung (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 12/016,081

(22) Filed: Jan. 17, 2008

(65) Prior Publication Data

US 2009/0110343 A1    Apr. 30, 2009

(30) Foreign Application Priority Data

Oct. 26, 2007    (TW)    .............. 96140396 A (51) Int. Cl.
*G02B 6/34*    (2006.01)
(52) U.S. Cl. .............. 385/37; 385/10; 430/290
(58) Field of Classification Search .......... 385/37; 430/290
See application file for complete search history.

(56) References Cited

U.S. PATENT DOCUMENTS

| | | | |
|---|---|---|---|
| 4,093,338 A | 6/1978 | Bjorklund et al. | |
| 5,367,588 A | 11/1994 | Hill et al. | |
| 5,830,622 A | 11/1998 | Canning et al. | |
| 5,945,261 A | 8/1999 | Rourke et al. | |
| 6,130,973 A | 10/2000 | Lauzon et al. | |
| 6,307,679 B1 * | 10/2001 | Kashyap | 359/569 |
| 6,465,153 B1 | 10/2002 | Kewitsch et al. | |
| 6,574,395 B1 | 6/2003 | Mechin et al. | |
| 6,614,959 B1 | 9/2003 | Mizrahi et al. | |
| 6,707,956 B1 * | 3/2004 | Kim et al. | 385/10 |
| 6,753,118 B2 | 6/2004 | Deshmukh et al. | |
| 6,801,689 B1 | 10/2004 | Sweetser et al. | |
| 6,813,079 B2 | 11/2004 | Laming et al. | |
| 6,834,977 B2 | 12/2004 | Suehiro et al. | |
| 6,882,777 B2 | 4/2005 | Shiozaki et al. | |

FOREIGN PATENT DOCUMENTS

EP    1 065 535 A3    1/2001

(Continued)

OTHER PUBLICATIONS

Loh et al., "Complex grating structures with uniform phase masks based on the moving fiber-scanning beam technique," Optics Letters, vol. 20, No. 20, pp. 2051-2053, 1995.

(Continued)

*Primary Examiner*—Tina M Wong
(74) *Attorney, Agent, or Firm*—Birch, Stewart, Kolasch & Birch, LLP (57) ABSTRACT

The present invention proposes a method for modulating refractive indices of optical fiber gratings, wherein the UV exposure on a least one assigned location of an optical fiber grating is divided into to two UV shots, and the intensities or phases of the two UV shots, which expose the location sequentially, are controlled to make the total exposure intensity of one assigned location maintained at a fixed value, whereby the interference fringes, which are created by a superposition of the two UV shots, have fixed phases and adjustable intensities, and whereby the dc index of the optical fiber grating maintains fixed and the ac index independently adjustable.

12 Claims, 8 Drawing Sheets

FOREIGN PATENT DOCUMENTS

| | | |
|---|---|---|
| JP | 2004-348025 A | 12/2004 |
| JP | 2005-31358 A | 2/2005 |
| TW | 436667 B | 5/2001 |
| TW | 200515020 | 5/2005 |
| TW | 200515021 | 5/2005 |
| TW | I238264 B | 8/2005 |

OTHER PUBLICATIONS

Chuang et al., "Complex fiber grating structures fabricated by sequential writing with polarization control," Optics Letters, vol. 29, No. 4, pp. 340-342, 2004.

Jensen et al., "Polarization control method for ultraviolet writing of advanced Bragg gratings," Optics Letters, vol. 27, No. 12, pp. 1004-1006, 2002.

Albert et al., "Apodisation of the spectral response of fibre Bragg gratings using a phase mask with variable diffraction efficiency," Electronics Letters, vol. 31, No. 3, pp. 222-223, 1995.

Chuang et al., "Pure Apodized Phase-Shifted Fiber Bragg Gratings Fabricated by a Two-Beam Interferometer With Polarization Control," IEEE Photonics Technology Letters, vol. 16, No. 3, pp. 834-836, 2004.

Malo et al., "Apodised in-fibre Bragg grating reflectors photoimprinted using a phase mask," Electronics Letters, vol. 31, No. 3, pp. 223-225, 1995.

Cole et al., "Moving fibre/phase mask-scanning beam technique for enhanced flexibility in producing fibre gratings with uniform phase mask," Electronics Letters, vol. 31, No. 17, pp. 1488-1490, 1995.

\* cited by examiner

METHOD FOR MODULATING REFRACTIVE INDICES OF OPTICAL FIBER GRATINGS

BACKGROUND OF THE INVENTION

1. Field of the Invention

The present invention relates to an optical fiber grating technology, particularly to a method for modulating refractive indices of optical fiber gratings.

2. Description of the Related Art

FBG (Fiber Bragg Grating) is a key element for fiber communication. FBG functions as a filter to reflect the incident light with a wavelength meeting the Bragg condition and permit the light having other wavelengths to pass. FBG is extensively used in WDM (Wavelength Division Multiplexing) systems, DWDM (Dense Wavelength Division Multiplexing) systems, fiber sensor technology and fiber laser technology.

In FBG fabrication, the cost and quality correlates closely with the variation of the refractive index of the fiber core. Recently, many FBG fabrication technologies have been proposed. A Taiwan patent pending of application No. 200515020 utilizes two polarized light beams, which are vertical to each other, to fabricate FBG, wherein one beam is used to write the fiber and modulate the refractive index, and the other beam is used to maintain the total exposure intensity at a given value. As this method has to control polarization, it needs additional optical elements to work, such as lenses, half-wave plates, and polarizing beam splitters, which will raise the cost. A Taiwan patent pending of application No. 200515021 controls the polarization direction of one light beam in a two beam interference method to maintain the total intensity at a given value, wherein the intensities of the interference fringes are modulated via the relative polarization directions of two light beams. This method can only apply to the two beam interference method. As this method also has to control polarization, it also needs additional optical elements, and the cost thereof also increases. In a paper, by J. B. Jensen, et al., in Optics Letters 2002, p. 1004, the polarization directions are controlled in the phase mask method to maintain the total exposure at a given intensity, and the intensities of the interference fringes are modulated with the intensities of two light beams having different polarization directions. This method can only apply to the phase mask method. As this method also has to control polarization, it also needs additional optical elements, such as half-wave plates and polarizers, and the cost thereof also increases.

In a U.S. Pat. No. 5,830,622, some specified positions are exposed to UV (Ultra-Violet) light to adjust the refractive index thereof and introduce additional phase shifts. However, this method needs double UV exposures, which is time-consuming. Further, it is hard to obtain the desired phase shifts section by section. In a paper, by J. Albert, et al., in Electronics Letters, 1995, p. 223, an optical fiber is written with a special phase mask. However, the length of the fiber grating will be limited by the length of the phase mask. Further, the special phase mask increases the cost. Besides, the method lacks the flexibility to fabricate other specifications of fiber gratings but can only fabricate a special specification fiber grating. In a paper, by M. J. Cole, et al., in Electronics Letters, 1995, p. 1488, a fuzzy technology is used to modulate the refractive index. In this method, a perturbation error is likely to be introduced into the length of the fiber grating. Further, the dc index does not maintain constant but has a slight perturbation.

Accordingly, the present invention proposes a novel method for modulating the refractive indices of optical fiber gratings to overcome the abovementioned problems.

SUMMARY OF THE INVENTION

One objective of the present invention is to provide a method for modulating refractive indices of optical fiber gratings, wherein two shots of UV (Ultra-Violet) beams respectively having adjustable phases and different intensities are sequentially projected on an identical location of an optical fiber grating, and whereby the dc index maintains fixed, and the ac index can be independently modulated with the cost reduced and without using additional optical elements.

Another objective of the present invention is to provide a method for modulating refractive indices of optical fiber gratings, whereby the ac index of an optical fiber grating can has an arbitrary profile.

Further objective of the present invention is to provide a method for modulating refractive indices of optical fiber gratings, which can modulate the refractive index at any position of an optical fiber grating.

In the method for modulating refractive indices of optical fiber gratings of the present invention, two shots of UV beams are sequentially projected on at least one location of an optical fiber grating; the total exposure intensity at one location is maintained constant; the intensities and phases of the two UV beams are controlled to maintain the dc index of the optical fiber grating fixed with the ac index adjustable. The present invention can also make the ac index of an optical fiber grating have an arbitrary profile. The two UV beams are sequentially and section by section projected on a plurality of locations of an optical fiber grating. In the entire exposure process, the two UV beams are equidistantly-spaced and partially-overlapped to expose the plurality of locations section by section, and the intensities and phases of the two UV beams are controlled to maintain the dc index fixed along the optical fiber grating and modulate the profiles of the ac index into an arbitrary shape.

Below, the embodiments of the present invention will be described in detail in cooperation with the attached drawings to make easily understood the objectives, technical contents, characteristics and accomplishments of the present invention.

BRIEF DESCRIPTION OF THE DRAWINGS

FIG. 6(*a*) is a diagram schematically showing a profile of the normalized ac index when the phase difference is π according to the present invention; and FIG. 6(*b*) is a diagram schematically showing a relationship between the intensity ratio and the normalized ac index when the phase difference is π according to the present invention.

DETAILED DESCRIPTION OF THE INVENTION

Figure 1:
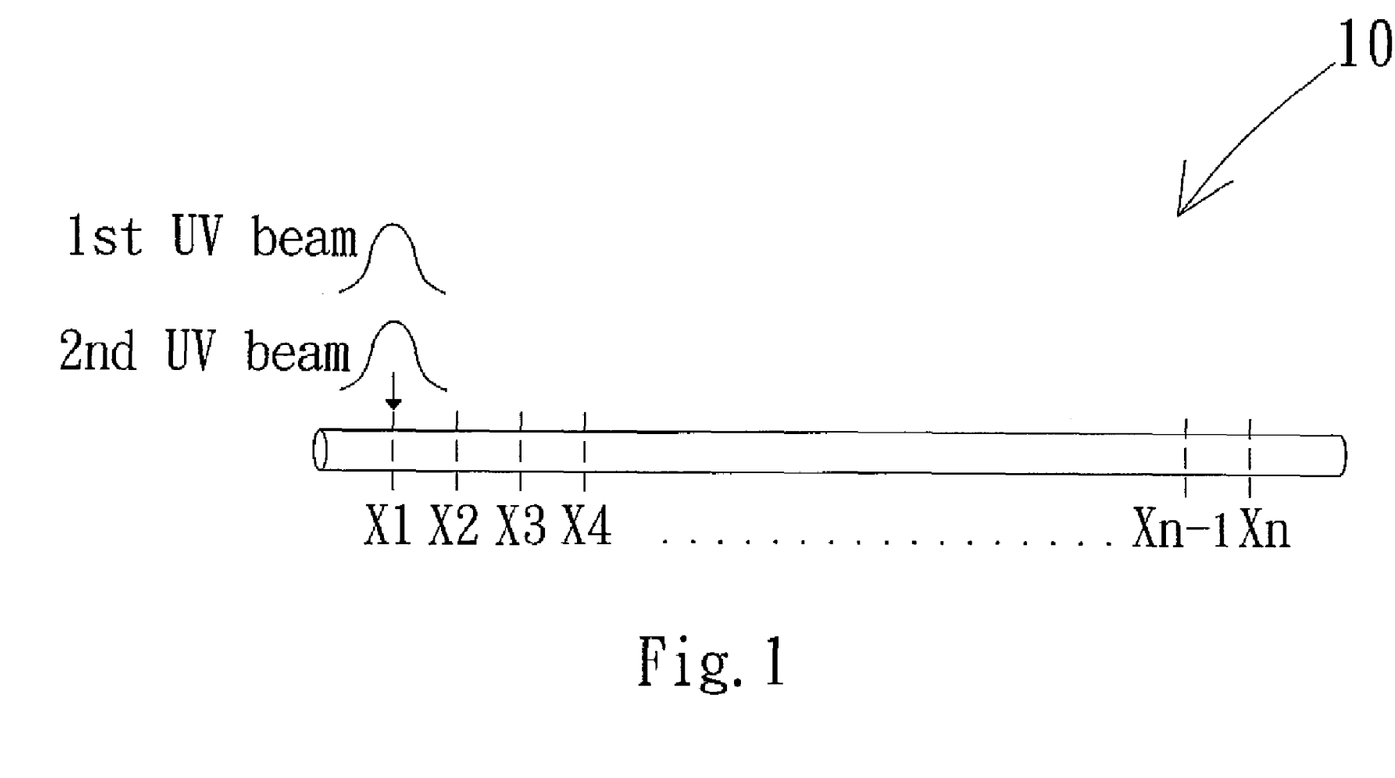
FIG. 1 and FIG. 2 are diagrams schematically showing the process of a method for modulating refractive indices of optical fiber gratings according to the present invention.
Figure 2:
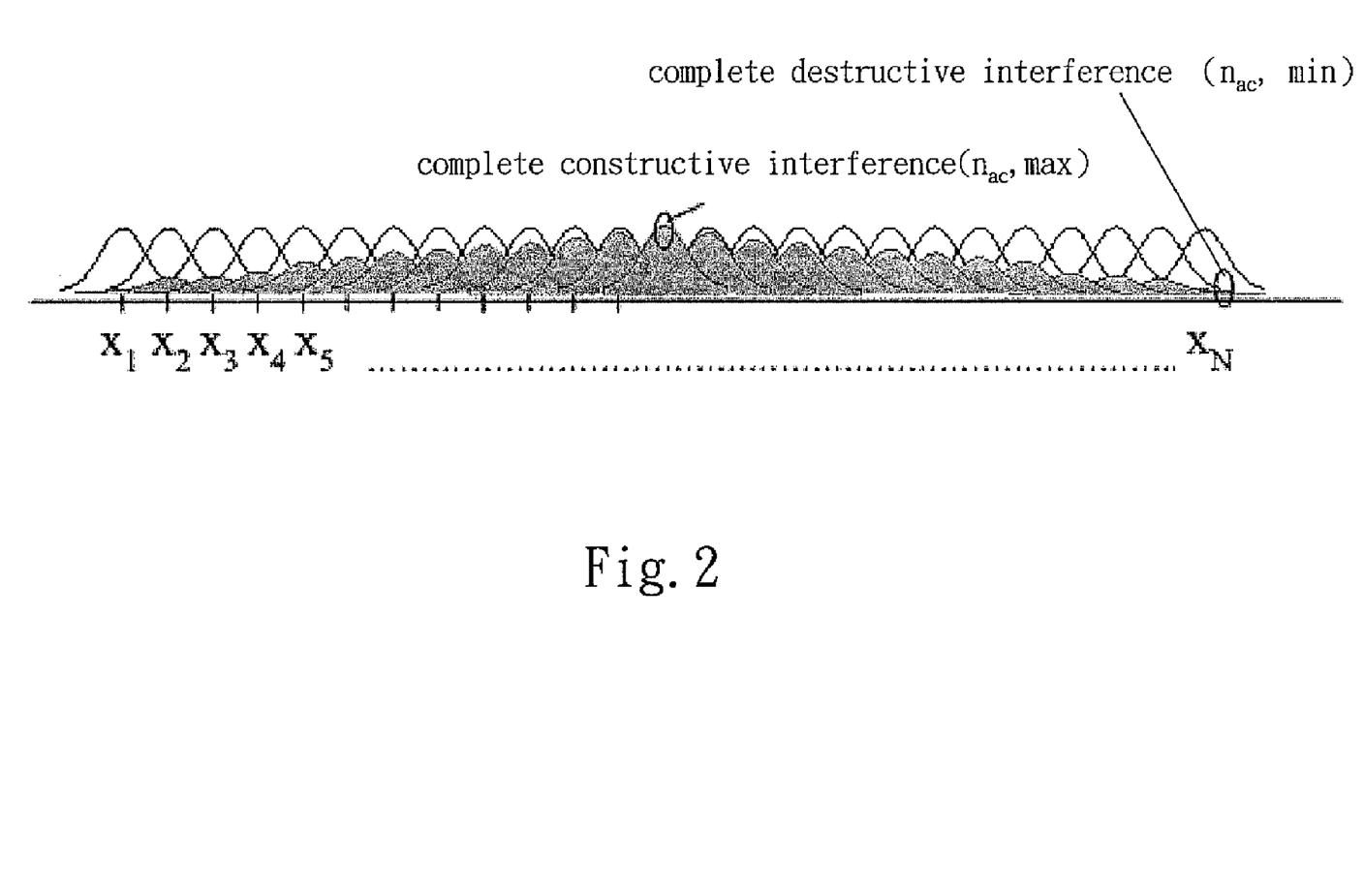

Refer to FIG. 1 and FIG. 2 diagrams schematically showing the process of a method for modulating refractive indices of optical fiber gratings according to the present invention. As shown in FIG. 1, the present invention provides an optical fiber grating 10. A plurality of locations X1, . . . , Xn is equidistantly assigned in the optical fiber grating 10 and divides the optical fiber grating 10 into a plurality of grating sections. The total exposure intensity at each location is written by two beams—UV beam 1 and UV beam 2. UV beam 1 and UV beam 2 have a Gaussian shape, and the phases and intensities of them are adjustable. UV beam 1 and UV shot 2 are sequentially projected on locations X1, . . . , and Xn section by section. In other words, UV beam 1 and UV beam 2 are sequentially projected on location X1; then, UV beam 1 and UV beam 2 are sequentially projected on locations X2, . . . , and Xn respectively. The total exposure intensity at each location is identical. UV beam 1 and UV beam 2 are equidistantly-spaced and partially-overlapped in exposing locations X1, . . . , and Xn, as shown in FIG. 2. UV beam 1 and UV beam 2 have continuous phases in the grating sections so as to form the fiber Bragg grating having the predetermined index profile by generating a constructive superposition. As UV beam 1 and UV beam 2 are equidistantly-spaced in exposing locations X1, . . . , and Xn, the dc index maintains fixed along the optical fiber grating 10, and the ac index can be modulated via changing the intensities and phases of UV beam 1 and UV beam 2.

Figure 3A:
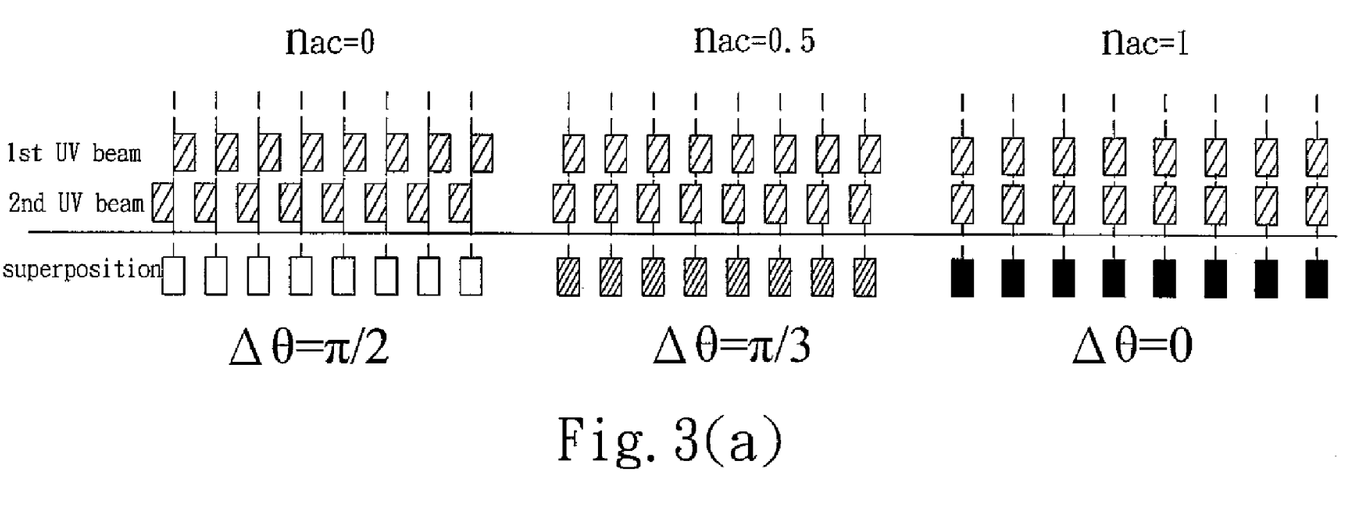
FIG. 3(a) is a diagram schematically showing a resultant amplitude of the a superposition of two UV beams with the phase differences thereof varied according to the present invention.
Figure 4:
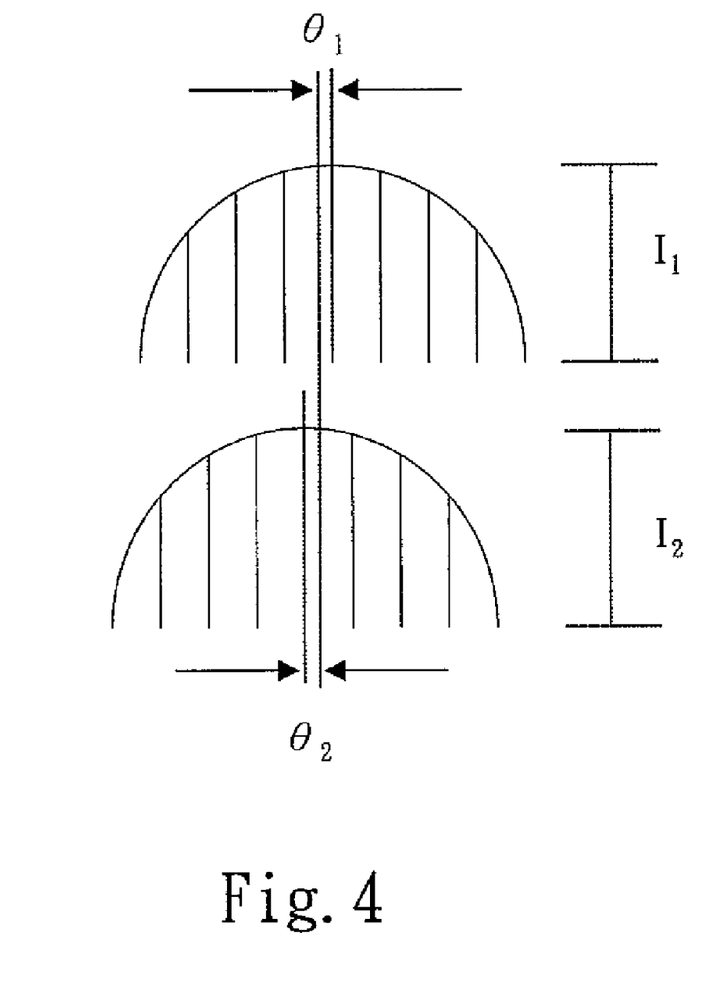
FIG. 4 is a diagram schematically showing amplitudes and phases of UV beam 1 and UV beam 2.

Below are disclosed two approaches of controlling the intensities and phases of UV beam 1 and UV beam 2 to modulate the ac index according to the present invention. In Approach I of the present invention, it is supposed that the total exposure intensity at each location is $2I_0$, and that the Gaussian-shaped UV beam 1 and UV beam 2 have an identical intensity $I_0$. The phase differences between one location (X2, . . . , or Xn) and the positions where UV beam 1 and UV beam 2 for the location are projected on the optical fiber grating 10 are respectively $\Delta\theta$ and $-\Delta\theta$. In other words, UV beam 1 and UV beam 2 have symmetric phase shifts. Thus, the phase difference between the fringe distribution created by a superposition of UV beam 1 and UV beam 2 and the corresponding grating section will be zero. Then, the ac index can be modulated via modulating the phase difference $\Delta\theta$ and $-\Delta\theta$. As the ac index $n_{ac}$ of the optical fiber grating varies linearly with the intensities of UV light, the ac index is proportional to the fringe distribution created by a superposition of UV beam 1 and UV beam 2. Refer to FIG. 3(*a*) a diagram schematically showing the ac indices at one location for different $\Delta\theta$'s when UV beam 1 and UV beam 2 has an identical intensity $I_0$. When $\Delta\theta=\pi/2$, complete destructive interference occurs, and the amplitudes thereof mutually cancel out, and $n_{ac}$ is minimum. When $\Delta\theta=\pi/3$, the amplitudes thereof partially cancel out. When $\Delta\theta=0$, complete constructive interference occurs and generates the greatest amplitude, and $n_{ac}$ is maximum. Refer to FIG. 4 a diagram schematically showing the amplitudes and phases of UV beam 1 and UV beam 2. UV beam 1 and UV beam 2 can be respectively expressed by Equation (1) and Equation (2):

$$I(x)=I_1 e^{i(kx+\theta_1)} \quad (1)$$

$$I(x)=I_2 e^{i(kx+\theta_2)} \quad (2)$$

wherein $I_1$ and $I_2$ are respectively the intensities of UV beam 1 and UV beam 2, and $\theta_1$ and $\theta_2$ are respectively the phase differences with respect to one location. The phase and amplitude of the interference fringe distribution created by a superposition of UV beam 1 and UV beam 2 can be expressed by Equation (3):

$$I(x)=I_1 e^{i(kx+\theta_1)}+I_2 e^{i(kx+\theta_2)} \quad (3)$$

Figure 5A:
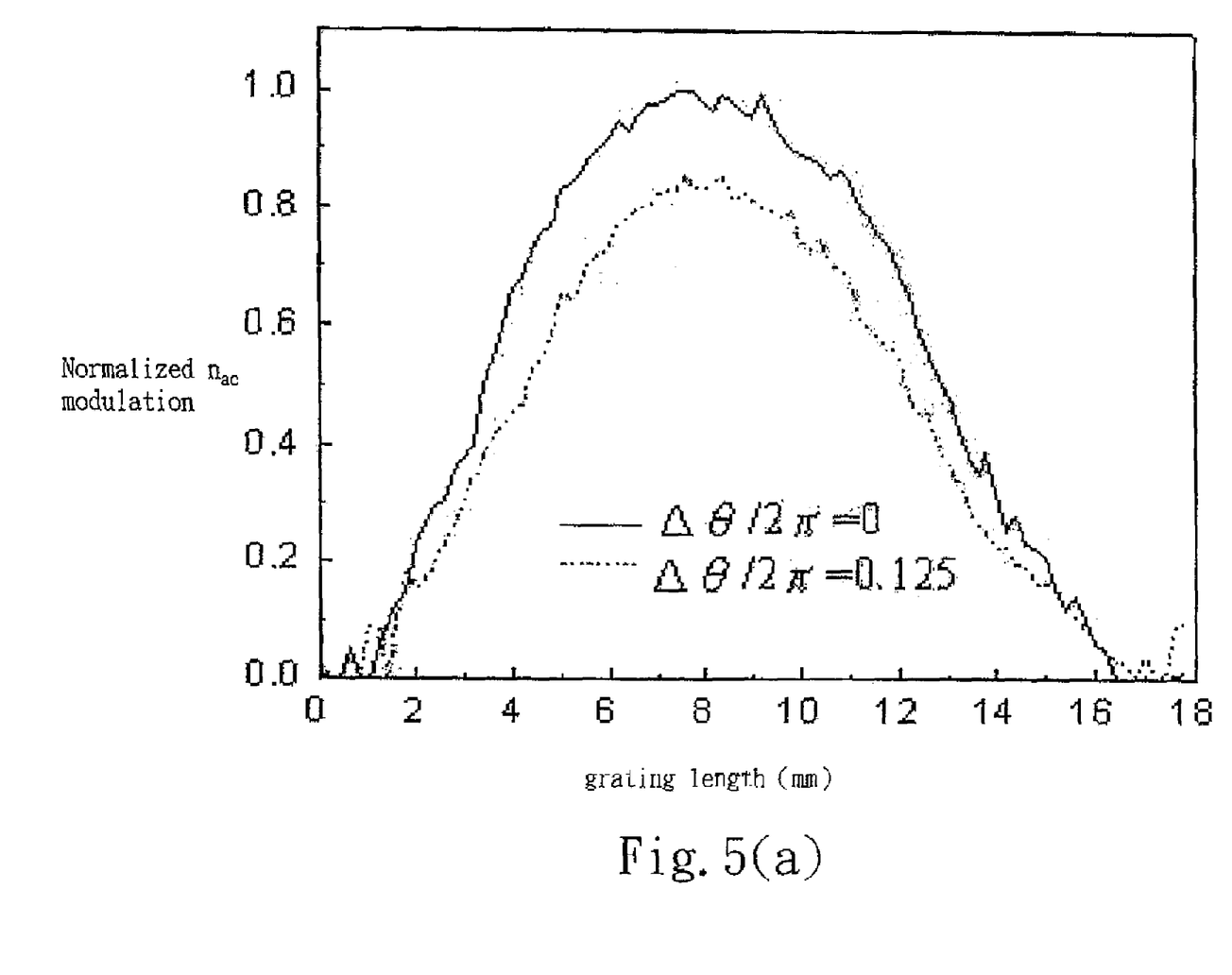
FIG. 5(a) is a diagram schematically showing a profile of the normalized ac index in the case of symmetric phase shifts according to the present invention.
Figure 5B:
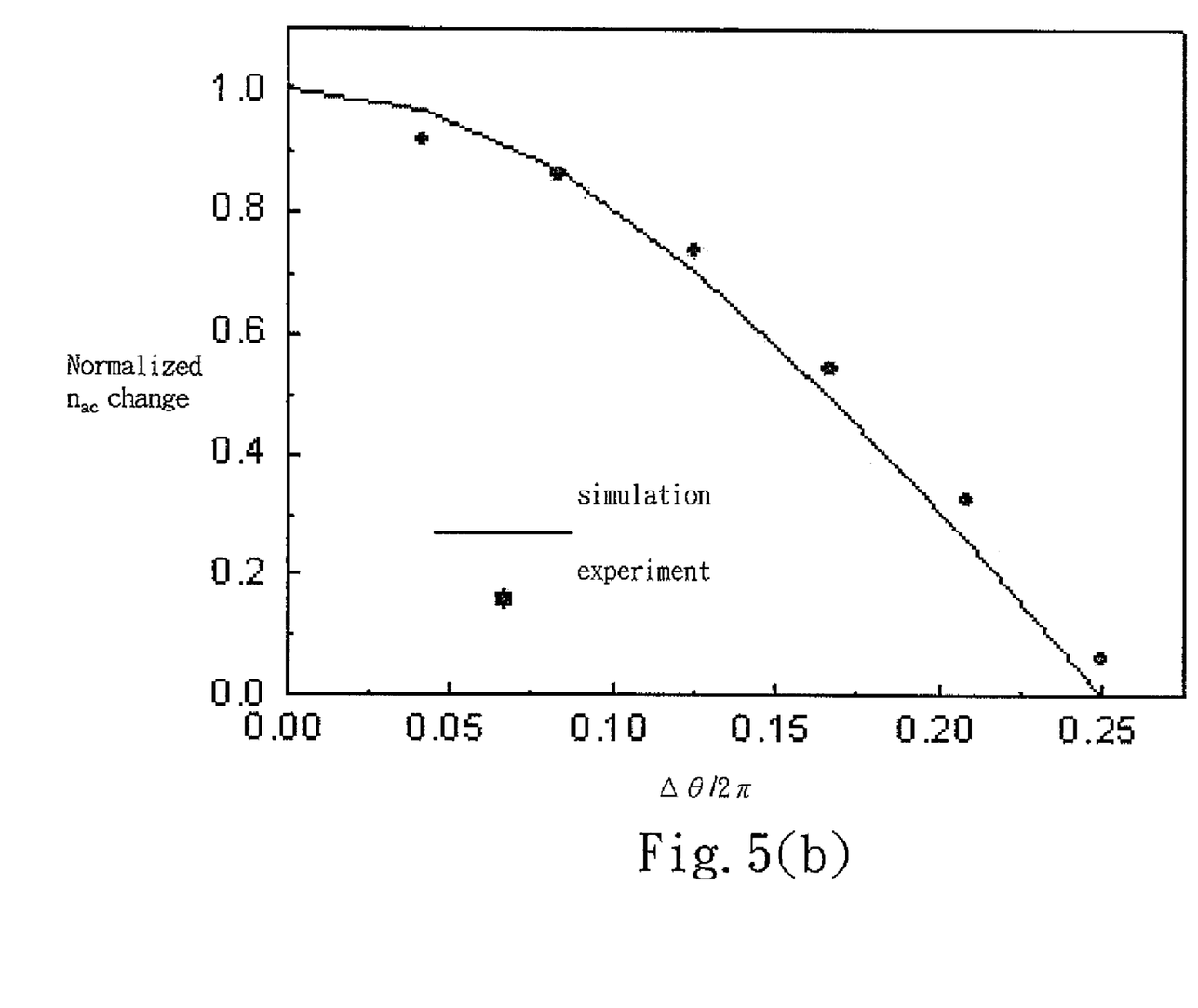
FIG. 5(b) is a diagram schematically showing a relationship between the phase difference and the normalized ac index in the case of symmetric phase shifts according to the present invention.

As UV beam 1 and UV beam 2 have an identical intensity $I_0$ and respectively have phase differences $\Delta\theta$ and $-\Delta\theta$, Equation (4) can be derived from Equation (3) and expressed by $$I(x)=2I_0 e^{ikx}\cos(\Delta\theta) \propto n_{ac} \quad (4)$$

wherein the ac index is proportional to the interference fringe distribution. Refer to Table 1 and FIG. 3(*a*) for the normalized ac indices with respect to several phase differences $\Delta\theta$ (0, π/3, π/2). Refer to FIG. 5(*a*) and FIG. 5(*b*) for the profiles of the normalized ac indices and the relationship between the phase difference and the normalized ac index.

Figure 3B:
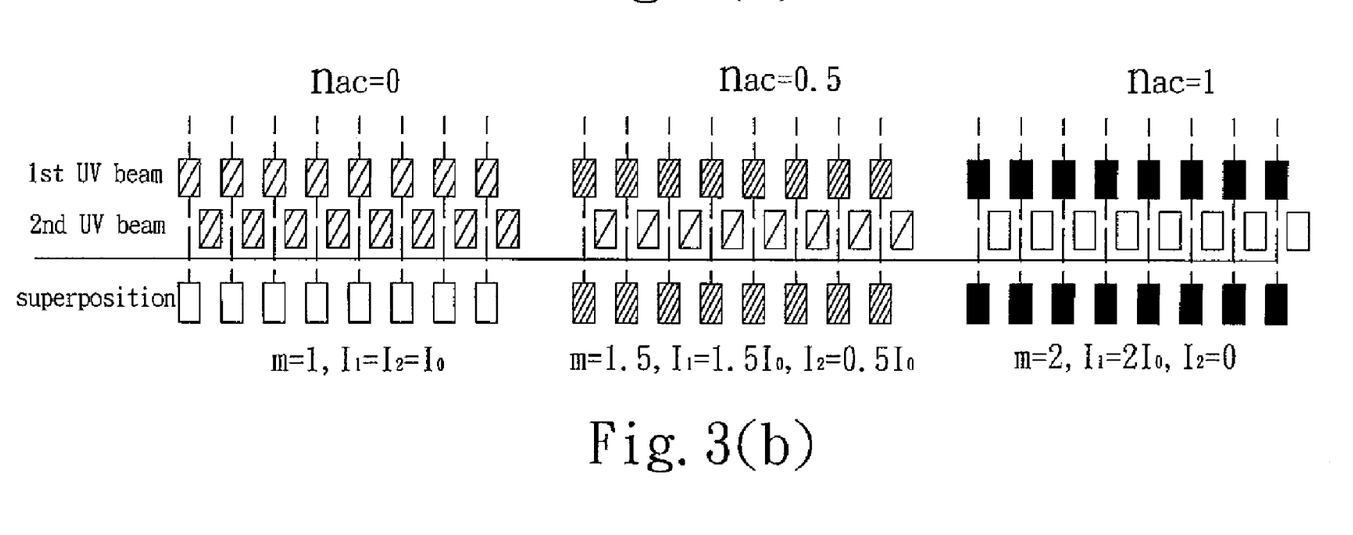
FIG. 3(b) is a diagram schematically showing a resultant amplitude of a superposition of two UV beams with the intensities thereof varied according to the present invention.

In Approach II of the present invention, it is supposed that the total exposure intensity at each location is $2I_0$, and that UV beam 1 and UV beam 2 have different intensities. In other words, UV beam 1 and UV beam 2 sequentially expose one location respectively with an intensity $mI_0$ and an intensity $(2 31 m)I_0$. Further, the phase differences between one location and the positions where UV beam 1 and UV beam 2 for the location are projected on the optical fiber grating 10 are respectively 0 and π. Thus, the phase difference between the fringe distribution created by a superposition of UV beam 1 and UV beam 2 and the corresponding grating section will be zero. Then, the ac index can be modulated via modulating the intensities of UV beam 1 and UV beam 2. Refer to FIG. 3(*b*) a diagram showing the ac indices at one location for different intensities of UV beam 1 and UV beam 2 when the phase differences of UV beam 1 and UV beam 2 with respect to the location are respectively 0 and π. When UV beam 1 and UV beam 2 have an identical intensity $I_0$, complete destructive interference occurs, and the amplitudes thereof mutually cancel out, and $n_{ac}$ is minimum. When UV beam 1 has an intensity $1.5I_0$ and UV beam has an intensity $0.5I_0$, the amplitudes thereof partially cancel out. When UV beam 1 has an intensity $2I_0$ and UV beam has an intensity 0, the resultant amplitude is completely contributed by UV beam 1, and $n_{ac}$ is maximum. The phase and amplitude of the interference fringe distribution created by a superposition of UV beam 1 and UV beam 2 can be expressed by Equation (5):

$$I(x)=2I_0 e^{ikx}(m-1) \propto n_{ac} \quad (5)$$

Figure 6A:
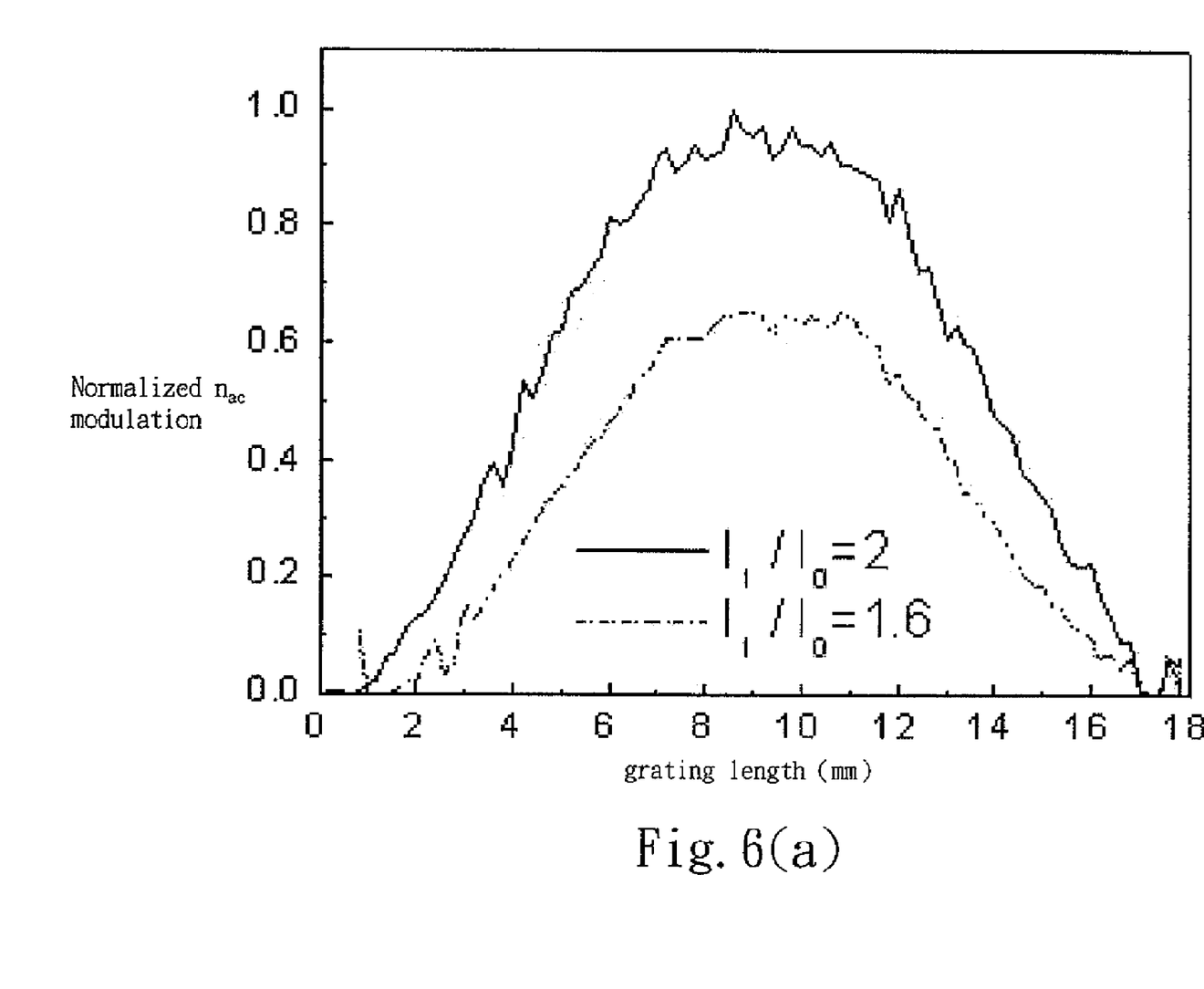
Figure 6B:
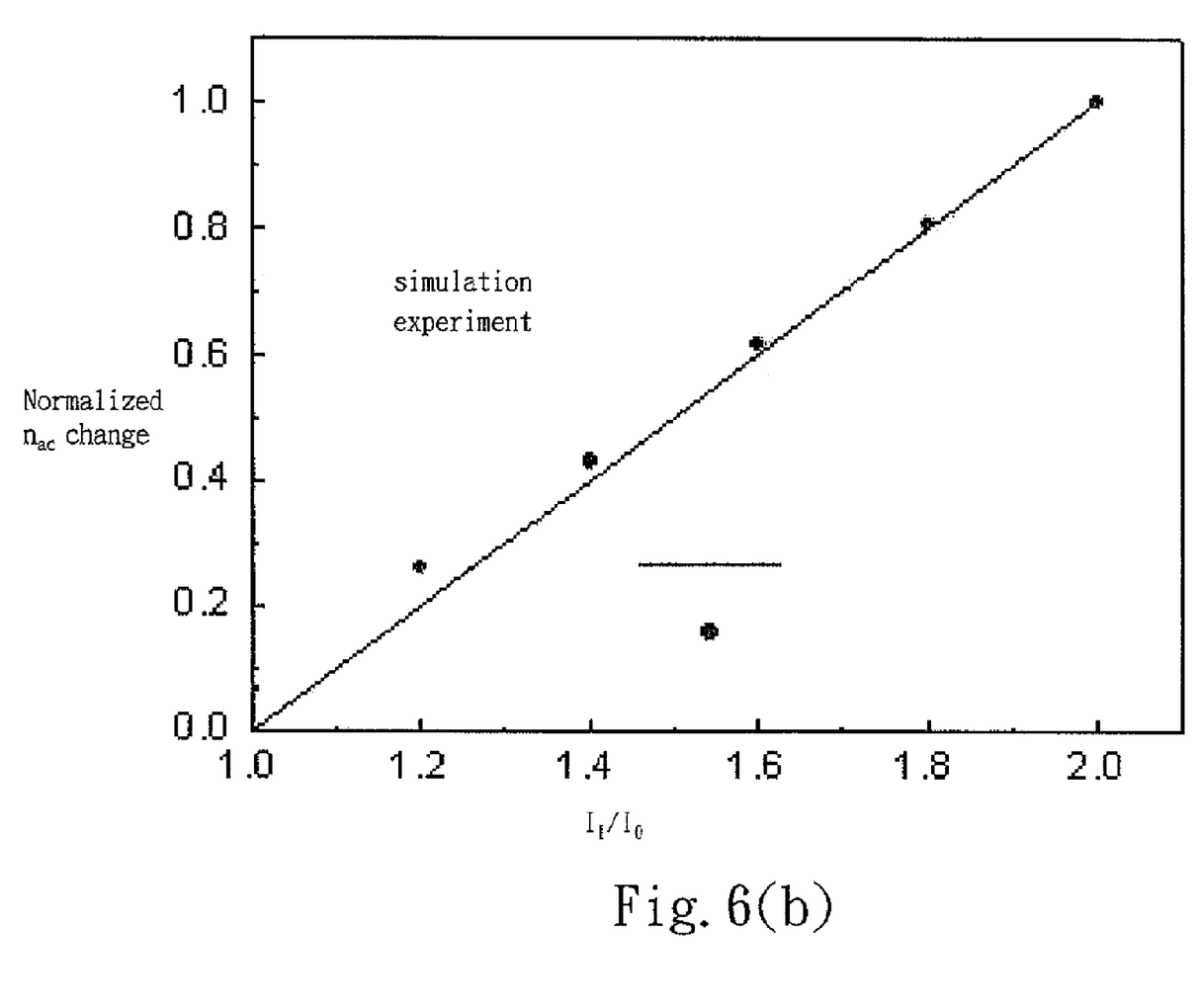

Refer to Table 1 and FIG. 3(*b*) for the ac indices with respect to different intensities in Approach II. Refer to FIG. 6(*a*) and FIG. 6(*b*) for the profiles of the normalized ac indices when the phase difference is π in Approach II and the relationship between the intensity ratio and the normalized ac index.

TABLE 1

| | Parameters | |
|---|---|---|
| | Approach I | Approach II |
| | $\theta_1 = -\theta_2 = \Delta\theta$ | $\theta_1 = 0, \theta_2 = \pi$ |
| Normalized $n_{ac}$ | $I_1 = I_2 = I_0$ | $I_1 = mI_0, I_1 + I_2 = 2I_0$ |
| $n_{ac} = 1$ | $\Delta\theta = 0$ | $m = 2$ |
| $n_{ac} = 0.5$ | $\Delta\theta = \pi/3$ | $m = 1.5$ |
| $n_{ac} = 0$ | $\Delta\theta = \pi/2$ | $m = 1$ |

From FIG. 5(*a*) and FIG. 6(*a*), it is known that an optical fiber grating with a bell-shaped ac index distribution is obtained via controlling the intensities or phases of two UV beams. The method for modulating refractive indices of optical fiber gratings of the present invention can apply to an optical fiber grating in any location where a refractive index modulation is intended. For example, when the refractive index modulation is only needed in one grating section, a location is assigned to the grating section, and two beams of UV beams are projected on the location with the phases or intensities of UV beams being varied according to one of the approaches of the present invention. Thus, the refractive index modulation is realized in the grating section. Therefore, the present invention can indeed modulate the profile of the ac index into an arbitrary shape.

In conclusion, the method for modulating refractive indices of optical fiber gratings of the present invention controls the phases and intensities to maintain the dc index fixed with the ac index independently adjustable without using additional optical elements. The method of the present invention is simple and cost-efficient. Further, the present invention can apply to the phase-mask and double beam interference technologies.

The embodiments described above are only to exemplify the technical thoughts and characteristics of the present invention to enable the persons skilled in the art to understand, make, and use the present invention. However, it is not intended to limit the scope of the present invention. Any equivalent modification or variation according to the spirit of the present invention is to be also included within the scope of the present invention.

What is claimed is:

1. A method for modulating refractive indices of optical fiber gratings comprising:
   providing an optical fiber grating having a plurality of assigned locations;
   providing a first UV (Ultra-Violet) beam and a second UV beam sequentially exposing said assigned locations section by section; and
   controlling intensities and phases of said first UV beam and said second UV beam for maintaining each said assigned location at a fixed value of a total exposure intensity exposed by said first UV beam and said second UV beam to modulate a refractive index of said optical fiber grating,
   wherein said first UV beam and said second UV beam respectively expose each said assigned location by an identical intensity; phase differences between each said assigned location and positions where said first UV beam and said second UV beam are projected on said optical fiber grating are respectively $\Delta\theta$ and $-\Delta\theta$; refractive indices of said optical fiber grating are modulated via varying said phase differences $\Delta\theta$ and $-\Delta\theta$.

2. The method for modulating refractive indices of optical fiber gratings according to claim 1, wherein said first UV beam has a continuous spectrum and is equidistantly spaced and partially overlapped to expose said assigned locations section by section.

3. The method for modulating refractive indices of optical fiber gratings according to claim 1, wherein said second UV beam has a continuous spectrum and is equidistantly spaced and partially overlapped to expose said assigned locations section by section.

4. The method for modulating refractive indices of optical fiber gratings according to claim 1, wherein said assigned locations are equidistantly arranged.

5. The method for modulating refractive indices of optical fiber gratings according to claim 1, wherein an amplitude-phase relationship of an interference fringe distribution created by a superposition of said first UV beam and said second UV beam on said optical fiber grating is expressed by $$I(x)=2I_0 e^{ikx}\cos(\Delta\theta),$$

wherein $I_0$ is an intensity of either of said first UV beam and said second UV beam.

6. The method for modulating refractive indices of optical fiber gratings according to claim 1, wherein said refractive index of said optical fiber grating is an ac index.

7. A method for modulating refractive indices of optical fiber gratings comprising:
   providing an optical fiber grating having a plurality of assigned locations;
   providing a first UV (Ultra-Violet) beam and a second UV beam sequentially exposing said assigned locations section by section; and
   controlling intensities and phases of said first UV beam and said second UV beam for maintaining each said assigned location at a fixed value of a total exposure intensity exposed by said first UV beam and said second UV beam to modulate a refractive index of said optical fiber grating,
   wherein said first UV beam and said second UV beam respectively expose each said assigned location by different intensities; phase differences between each said assigned location and positions where said first UV beam and said second UV beam are projected on said optical fiber grating are respectively 0 and $\pi$; refractive indices of said optical fiber grating are modulated via varying intensities of said first UV beam and said second UV beam.

8. The method for modulating refractive indices of optical fiber gratings according to claim 7, wherein an amplitude-phase relationship of an interference fringe distribution created by a superposition of said first UV beam and said second UV beam on said optical fiber grating is expressed by $$I(x)=2I_0 e^{ikx}(m-1),$$

wherein said first UV beam has an intensity $mI_0$, and said second UV beam has an intensity $(2-m)I_0$.

9. A method for modulating refractive indices of optical fiber gratings comprising:
   providing an optical fiber grating having at least one assigned location;
   providing a first UV beam and a second UV beam sequentially exposing said assigned location; and
   controlling intensities and phases of said first UV beam and said second UV beam for maintaining said assigned location at a fixed value of a total exposure intensity exposed by said first UV beam and said second UV beam to modulate a refractive index of said optical fiber grating,
   wherein said first UV beam and said second UV beam respectively expose said assigned location by an identical intensity; phase differences between said assigned location and positions where said first UV beam and said second UV beam are projected on said optical fiber grating are respectively $\Delta\theta$ and $-\Delta\theta$; refractive indices of said optical fiber grating are modulated via varying said phase differences $\Delta\theta$ and $-\Delta\theta$.

10. The method for modulating refractive indices of optical fiber gratings according to claim 9, wherein said first UV beam and said second UV beam have continuous spectrums.

11. The method for modulating refractive indices of optical fiber gratings according to claim 9, wherein an amplitude-phase relationship of an interference fringe distribution created by a superposition of said first UV beam and said second UV beam on said optical fiber grating is expressed by $$I(x)=2I_0 e^{ikx} \cos(\Delta\theta),$$

wherein $I_0$ is an intensity of either of said first UV beam and said second UV beam.

12. The method for modulating refractive indices of optical fiber gratings according to claim 9, wherein said refractive index of said optical fiber grating is an ac index.

* * * * *